June 9, 1964 W. W. MILLER Re. 25,590

SILL ASSEMBLY FOR EXTERIOR OPENINGS

Original Filed Oct. 9, 1956 2 Sheets-Sheet 1

INVENTOR.
WALLACE W. MILLER
BY
Knox & Knox

SILL ASSEMBLY FOR EXTERIOR OPENINGS

Original Filed Oct. 9, 1956 2 Sheets-Sheet 2

INVENTOR.
WALLACE W. MILLER
BY
Knox & Knox

United States Patent Office

Re. 25,590
Reissued June 9, 1964

25,590
SILL ASSEMBLY FOR EXTERIOR OPENINGS

Wallace W. Miller, San Diego, Calif.
(205 N. 3rd, El Cajon, Calif.)

Original No. 3,032,839, dated May 8, 1962, Ser. No. 82,127, Jan. 11, 1961, which is a continuation of Ser. No. 614,976, Oct. 9, 1956. Application for reissue Sept. 3, 1963, Ser. No. 306,401
7 Claims. (Cl. 20—64)

Matter enclosed in heavy brackets [ ] appears in the original patent but forms no part of this reissue specification; matter printed in italics indicates the additions made by reissue.

This application is a continuation of application Serial No. 614,976, filed October 9, 1956, which has now become abandoned.

This invention relates generally to building structures and more particularly to a sill assembly, and still more particularly to an assembly wherein the sill per se can be used without the other elements of the assembly, or with one or other of these other elements, which other elements are termed herein the threshold and a pair of wedges.

A primary object of this invention is to provide apparatus for use in the finishing of exterior openings in buildings, with an improvement in the overall efficiency of the finished product, as well as an accelerated and simplified building procedure being made possible by the use of this invention.

An ancillary object of this invention is to provide apparatus which, when fully used, will considerably decrease the actual labor and skill required in finishing exterior openings.

Another object, equally important, is to provide a threshold which can be employed with a door having an interlocking type of weather stripping on its lower edge, and which will drain any moisture from the interior side of the door to the sill at the exterior side of the same door, without any deleterious effects or the addition of any unsightly structure.

Yet an other object of this invention is to provide a sill and threshold assembly wherein the threshold is reversible for use with finished floors of different thicknesses.

Another object of this invention is to provide a sill and wedge assembly which is extremely simple to install and which provides a perfectly finished appearance, the life of the framework of the exterior opening of the building being considerably lengthened when this assembly is used in the construction thereof.

With these objects definitely in view, along with other objects which will appear hereinafter as this description proceeds, this invention consists in the novel construction, combination and arrangement of elements and portions, as will be hereinafter fully described in the specification, particularly pointed out in the claims, and illustrated in the drawings which form a material part of this disclosure and in which:

FIGURE 1 is a fragmentary, isometric view of a doorway with this invention incorporated therein, certain portions being shown in vertical section, the figure being proposed as showing how the sill, wedges and threshold are positionally related in use;

FIGURE 2 is a view of the sill and one of the pair of wedges, in properly related position and the fragmentary showing of a wall being included in the figure to indicate how this assembly is used in an exterior opening of window character, this figure also representing the relationship of the sill and wedges when used without a threshold, although the floor would in the latter case extend to the left of the structure shown in the figure;

Similar characters of reference designate similar or identical elements and portions throughout the specification and throughout the different views in the drawing.

Figure 1:
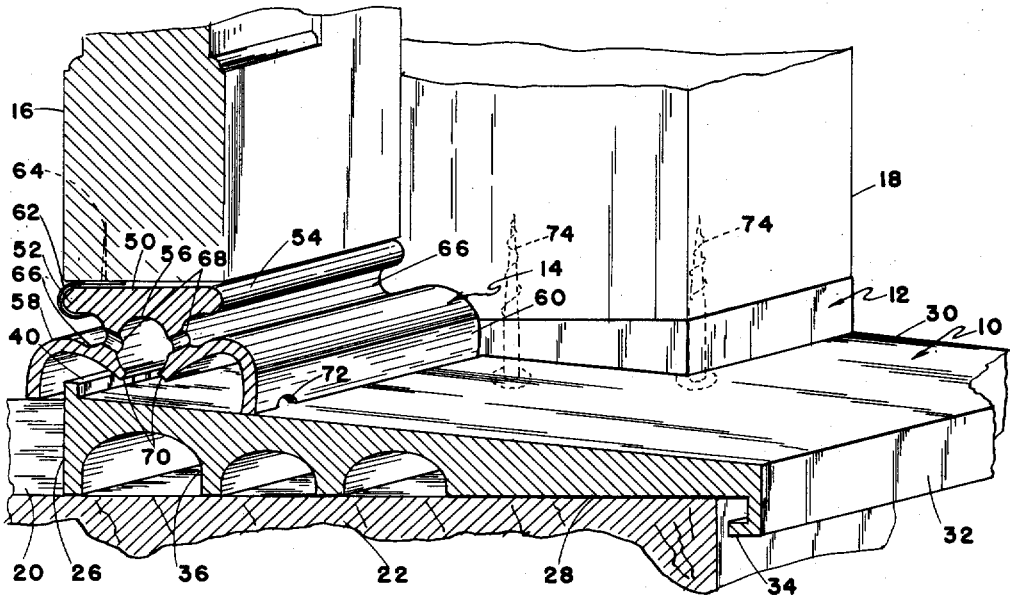

Referring now to the drawings in detail it will first be noted that this assembly includes a sill generally indicated at 10, a pair of wedges one of which is shown at 12 and a threshold 14.

The environment wherewith this invention will be used includes a door, ordinarily an inwardly swinging door, with a door frame, the door being indicated at 16 and the door frame at 18 in FIGURE 1. Finish flooring 20 and rough flooring 22 are also indicated fragmentarily in FIGURE 1, it being noteworthy that tile or carpet will in some cases be added to the structure shown. Wall structure 24 is indicated fragmentarily in FIGURE 2.

Figure 8:
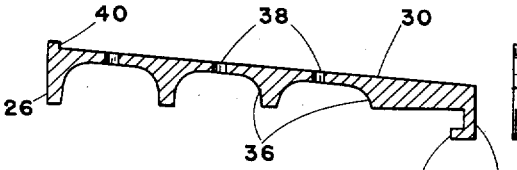
FIGURE 8 is a vertical sectional view taken substantially on the line 8—8 in FIGURE 7.
Figure 7:
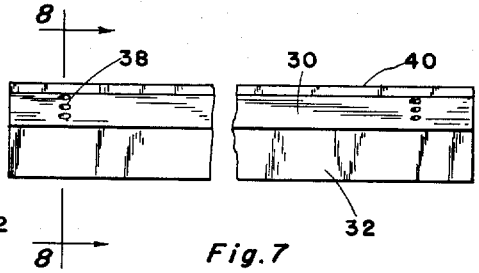
FIGURE 7 is a front elevational view of the sill.

Coming now to a more particular description of the sill per se, it will first be noted that this sill is of slab form with a vertical face 26 at one longitudinal edge of the slab, the sill being generally rectangular in plan form. The sill has a horizontal base 28 and a sloping upper face 30, with a vertical faceplate 32 at what may be considered the outer edge of the sill. This vertical faceplate 32 depends below the adjacent portions of the sill and terminates in a drip edge 34. Channels 36 are formed in the underside of the sill, in that portion of the sill remote from the faceplate 32. Rows of bores 38 are provided in lateral edge portions of the sill, as best illustrated in FIGURES 7 and 8, and a watershed lip 40 extends upwardly from the upper face 30, as indicated in FIGURES 1, 2, 7 and 8, the face of this lip 40 being co-planar with the above mentioned vertical face 26 at that edge of the sill.

Figure 2:
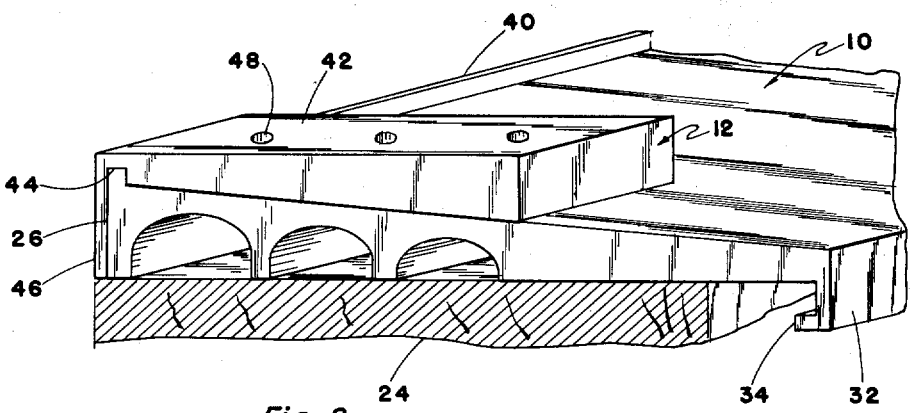
Figure 4:
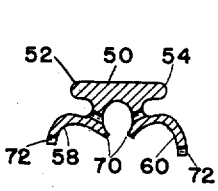
FIGURE 4 is a vertical sectional view of the threshold, taken substantially on the line 4—4 in FIGURE 3.
Figure 3:
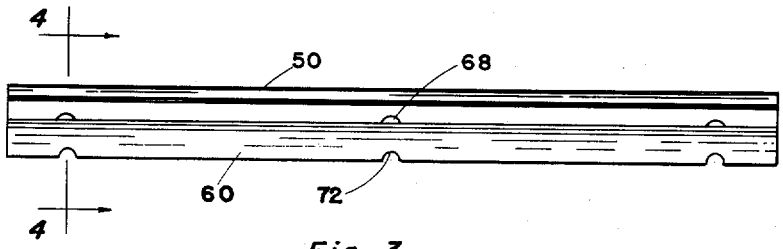
FIGURE 3 is a side elevational view of the threshold.
Figure 6:
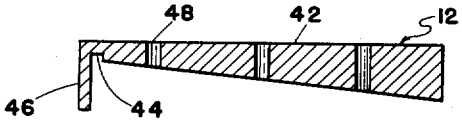
FIGURE 6 is a vertical sectional view taken on the line 6—6 in FIGURE 5.
Figure 5:
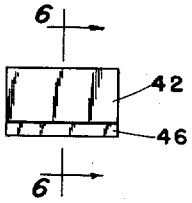
FIGURE 5 is an end elevational view of one of the wedges.

A pair of wedges will ordinarily be used with the sill 10, each wedge having a body portion 42 which is tapered throughout its length and a grooved portion 44 is provided adjacent the end of the wedge which will be disposed inwardly of the assembly, this groove portion fitting over the watershed lip 40, and each wedge has an end plate 46 which extends vertically downward to provide a finish face for the assembly, this being particularly valuable when the assembly is used, as indicated in FIGURE 2, for a window sill. A plurality of bores 48 are provided in the body portion 42 of each wedge, these bores 48 registering with the bores 38 of the sill.

Coming now to the threshold, this element will be seen to include a tread 50 having portions 52 and 54 extending horizontally beyond a neck 56 which connects the tread with the base of the threshold, this base being constituted of a pair of parallel legs 58 and 60. These legs are each arcuate in cross-sectional shape and are spaced widely apart to provide stability to the threshold. The leg 58 is considerably shorter in its effective vertical dimension than is the leg 60. This difference in the vertical dimensions of the legs enables the user to use the threshold with finish floors of different thicknesses. For example, when the finish floor 20 is relatively thick, the shorter leg 58 is disposed inwardly of the opening, the longer leg 60 then resting on the inclined surface of the sill and the tread surface being disposed in horizontal position alternatively, when the finish floor 20 is of lesser vertical dimension, then the threshold is reversed, end to end, and the shorter leg 58 is disposed outwardly of the opening to compensate for the lesser of the finish floor.

It is an important feature of this invention that the extending portions 52 and 54 are selectively engageable with an interlocking type resilient bottom weather strip 62, such as is now commonly required for doors in exterior openings. These interlocking weather strips are ordinarily secured by nails, such as that indicated at 64 on the bottom edge of the door 16. Channels 66 are provided, adjacent the neck 56, in the threshold, the highest portions of the legs 58 and 60 being slightly above the corresponding bottoms of these channels 66, so that moisture draining down from the door 16 and following the interlocking weather strip 62 will collect in the channel 66 disposed inwardly of the door opening. Drainage apertures 68 are provided in the neck 56 to communicate with the corresponding channels 66 and the space between the legs 58 and 60, and baffles 70 are formed integral with the neck portion to direct water from the drainage apertures 68 toward a limited area substantially midway between the said legs. Weep holes are provided in the lower edges of both legs, and water reaching the above mentioned are between the legs and will gravitate through these weep holes and escape onto the upper surface of the sill 10.

It should be particularly noted that the water shed lip 40 is disposed on the upward or inward side of the corresponding baffle 70, in all cases, so that this watershed further insures that no drainage will find escape toward the building.

When installing, the sill and wedges are secured by wood screws 74, or the like, and inserted through the bores 38 and 48, into the lower ends of the frame elements of the opening, afterwards the frame elements with the parts attached are slid into place. In attaching the threshold, holes are bored through the tread and wood screws of the like are used to hold this element in place.

The operation of this invention has been referred to in some detail during the foregoing description of the mechanical details thereof, and further description would appear to be unnecessary. It is obvious that all the objects set forth in the preamble to this specification are amply achieved by this invention.

Minor variation from the form disclosed herein may be resorted to without departure from the spirit and scope of this invention and what I claim as new and desire by Letters Patent is:

1. The combination of a finish floor; a door sill comprising a slab of generally rectangular plan form and tapering *from a maximum vertical thickness adjacent one longitudinal edge* toward a minimum vertical thickness adjacent *the other* [one] longitudinal edge [portion] thereof, [an upstanding watershed lip on the upper surface of the slab and extending along the opposite edge of the slab,] said slab having a plurality of channels extending longitudinally of the sill on the under face thereof and in the portion of the sill remote from said *other longitudinal* edge [portion], said door sill having a vertical face at *said one longitudinal* [the] edge thereof [remote from said edge portion and] abutting an edge of said finish floor; [said watershed lip extending above the level of said edge of the finish floor;] and a threshold straddling said [watershed lip] *one longitudinal edge* and having a portion thereof resting upon said sill.

2. A sill and threshold assembly comprising: a sill of generally rectangular plan form and tapering *from a maximum vertical thickness adjacent one longitudinal edge* toward a minimum vertical thickness adjacent [one] *the other* longitudinal edge thereof [, said sill having a watershed lip on the upper surface of the sill along the opposite edge thereof]; and a threshold discrete from and having a portion thereof resting upon said sill and comprising a tread, and a base having leg portions straddling said *one longitudinal edge* [watershed lip] and supporting said tread, said threshold having an overall transverse dimension much less than the corresponding transverse dimension of the sill and said threshold covering only a small edge portion of the sill adjacent to said *one longitudinal edge* [watershed lip].

[3. A sill and threshold assembly comprising: a sill of generally rectangular plan form and tapering toward a minimum vertical thickness adjacent one longitudinal edge thereof, said sill having a watershed lip on the upper surface of the sill along the opposite edge thereof; and a threshold discrete from said sill and comprising a tread, and a base having leg portions straddling said watershed lip and supporting said tread; one of said legs being vertically shorter than the other and said threshold being reversible with respect to said sill in installations where the finish floor structure is at different levels relative to an adjacent portion of the sill; one of said legs resting upon said sill, the other of said legs being dimensioned to rest upon an adjacent portion of a finished floor surface.]

[4. A threshold for use with a sill, said threshold comprising: a tread, a supporting base having a pair of spaced apart legs extending longitudinally of the tread and unitary therewith, said legs being of unequal vertical length and the bottoms of said legs being at unequal height when said tread is horizontal, said threshold being substantially symmetrical about a vertical plane through the longitudinal center line of said tread except for the inequality in the height of the bottoms of said legs, said threshold being adaptable to use with finished floors at different heights relative to an adjacent sill by mere reversal, end to end, of said threshold relative to a sill.]

[5. A threshold for use with an exterior door and sill comprising: a tread, a supporting base having a pair of spaced legs extending longitudinally of the threshold, one of said legs being vertically shorter than the other to accommodate said threshold to different installations wherein a finish floor surface is at different levels relative to an adjacent sill structure, said threshold being reversible end to end with respect to said adjacent sill structure, with one leg of said threshold resting upon said sill and the other leg resting upon the finished floor surface; said tread being normal to and substantially symmetrical about a vertical plane through the longitudinal center line of said tread, and the entire threshold being substantially symmetrical about said plane except for the difference in length of said legs, whereby mere reversal of the threshold serves to adapt the same to use in doorways where the finished floor is either higher or lower than the portion of the sill upon which one of said legs rests, said tread and legs being unitary.]

6. A threshold for use with an inwardly opening, exterior door comprising: a tread, a supporting base having a pair of spaced legs extending longitudinally of the threshold said tread including portions each extending horizontally above and parallel to one of said legs, drainage channels defined in said threshold between each of said portions of the tread and the adjacent legs, said drainage channels having communication with the space between said legs, both legs having weep holes; one of said legs being vertically shorter than the other leg; the difference in the length of said legs adapting the threshold to use in installations where a finish floor structure is at different levels relative to an adjacent portion of a sill; and said threshold being reversible, end to end, with respect to said sill, so that one leg of said threshold rests upon the upper surface of said sill and the other leg rests upon the finished floor surface at either of two levels with said tread disposed properly horizontal.

7. A threshold and sill assembly for use with a door, said assembly comprising: a threshold having a tread, a supporting base having a pair of spaced legs extending longitudinally of the threshold, said tread having a portion extending horizontally above and parallel to the adjacent one of said legs, a drainage channel defined in said threshold between said portion of the tread and said adjacent one of said legs, said channel having communication with the space between said legs; one of said legs being an inwardly disposed leg with reference to said door and resting upon a finished floor surface and the other leg being an outwardly disposed leg with reference to said door and having weep holes; a sill discrete from said threshold, disposed beneath said threshold and having a downwardly sloping surface beneath said outwardly disposed leg and a watershed lip upstanding from said surface of the sill and disposed between said legs to prevent drainage flow thereon toward said inwardly disposed leg, said outwardly disposed leg resting upon an intermediate portion of the upper surface of said sill.

8. An assembly according to claim 7 wherein said threshold has baffle means between said legs and disposed to direct flow from said channel to a limited area substantially midway between said legs.

9. A threshold, sill and wedge assembly for use with a door having an interlocking type bottom weather strip, said assembly comprising: a threshold having a tread, a supporting base having a pair of spaced legs extending longitudinally of the threshold, said tread having a portion extending horizontally above and parallel to the adjacent leg, a drainage channel defined in said threshold between said portion of the tread and the adjacent leg, said channel having communication with the space between said legs and the other leg having weep holes; and a sill discrete from said threshold, disposed beneath said threshold and having a downwardly sloping surface beneath said other leg, a watershed lip upstanding from said surface and disposed between said legs to prevent drainage flow thereon toward the first mentioned leg; and a pair of wedges each having a body portion with vertical bores therein, and a grooved portion to hook over said watershed lip at each end thereof, said sill having corresponding bores in the end portions thereof in register with the first mentioned bores whereby the sill and wedges are rendered easily securable in relating fixed relation by screws inserted from the bottom upwardly through said sill and wedge into door frame structure, said threshold having one of said legs resting upon the upper surface of the sill, and the other leg resting upon an adjacent portion of a floor surface.

[10. A sill according to claim 1 and a pair of wedges each having a body portion with vertical bores therein, a grooved portion to fit over said watershed lip, and an end plate abutting said vertical face of the sill, said sill having corresponding vertical bores therein in register with the first mentioned bores.]

[11. A still and threshold assembly comprising: a sill of generally rectangular plan form and tapering toward a minimum vertical thickness adjacent one longitudinal edge thereof, said sill having a watershed lip on the upper surface of the sill along the opposite edge thereof; and a threshold discrete from said sill and comprising a tread, and a base having leg portions straddling said watershed lip and supporting said tread, said leg portions being dissimilar for adaption to different installations and said threshold being reversible, end to end, with respect to said sill.]

*12. The combination of a finish floor; a door sill comprising a slab of generally rectangular plan form and tapering toward a minimum vertical thickness adjacent one longitudinal edge portion thereof and having a vertical face at the opposite edge of the slab, an upstanding watershed lip on the upper surface of the slab and extending above said opposite edge of the slab, said slab having a plurality of channels extending longitudinally of the sill on the under face thereof and in the portion of the sill remote from said edge portion, and abutting an edge of said finish floor; said watershed lip extending above the level of said edge of the finish floor; a threshold straddling said watershed lip and having a portion thereof resting upon said sill; and a pair of wedges each having a body portion with vertical bores therein to fit over said watershed lip, and an end plate abutting said vertical face of the sill, said sill having corresponding vertical bores therein in register with the first mentioned bores.*

References Cited in the file of this patent or the original patent

UNITED STATES PATENTS

| | | |
|---|---|---|
| 1,840,879 | Barringer | Jan. 12, 1932 |
| 1,916,681 | Nagel | July 4, 1933 |
| 2,872,714 | Odegaard et al. | Feb. 10, 1959 |
| 2,875,481 | Erkilla | Mar. 3, 1959 |
| 2,898,642 | Etling | Aug. 11, 1959 |